(12) United States Patent
Shirasaka et al.

(10) Patent No.: US 8,400,571 B2
(45) Date of Patent: Mar. 19, 2013

(54) TELEVISION AND ELECTRONIC APPARATUS

(75) Inventors: Hideo Shirasaka, Ome (JP); Tetsuhiko Fukazawa, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/150,820

(22) Filed: Jun. 1, 2011

(65) Prior Publication Data
US 2011/0292305 A1 Dec. 1, 2011

(30) Foreign Application Priority Data
Jun. 1, 2010 (JP) ................................. 2010-126145

(51) Int. Cl.
*H04N 7/18* (2006.01)
(52) U.S. Cl. ....................................... 348/836; 348/843
(58) Field of Classification Search ........... 348/836–843
See application file for complete search history.

(56) References Cited

U.S. PATENT DOCUMENTS

| | | | |
|---|---|---|---|
| 7,652,729 | B2 | 1/2010 | Minaguchi et al. |
| 2006/0066769 | A1 | 3/2006 | Minaguchi et al. |
| 2007/0195220 | A1 | 8/2007 | Ono |
| 2011/0285925 | A1* | 11/2011 | Ono et al. ................ 348/836 |
| 2011/0310315 | A1* | 12/2011 | Yamaguchi ............... 348/836 |

FOREIGN PATENT DOCUMENTS

| | | |
|---|---|---|
| JP | U 3-40999 | 4/1991 |
| JP | 2003-081331 | 3/2003 |
| JP | 2006-099242 | 4/2006 |
| JP | 2006-331103 | 12/2006 |
| JP | 2007-249195 | 9/2007 |

OTHER PUBLICATIONS

Explanation of Non-English Language Reference.
Japanese Office Action for application No. JP2010-126145 dated Nov. 22, 2011 in 5 pages.

* cited by examiner

*Primary Examiner* — Andy Rao
(74) *Attorney, Agent, or Firm* — Knobbe Martens Olson & Bear LLP

(57) ABSTRACT

According to one embodiment, an electronic apparatus includes a casing, a display module, a first receiving portion and a second receiving portion. The casing includes a first inner face and a second inner face. The display module includes a base portion arranged on the first inner face, and a panel laid over the base portion and opposed to the second inner face. The first receiving portion protrudes from the first inner face along a side face of the display module. The first receiving portion is opposed to a side face of the base portion and includes a distal end located away from a side face of the panel in a direction toward the first inner face. The second receiving portion is located more away from the display module than the first receiving portion is. The second receiving portion is opposed to the side face of the panel.

17 Claims, 16 Drawing Sheets

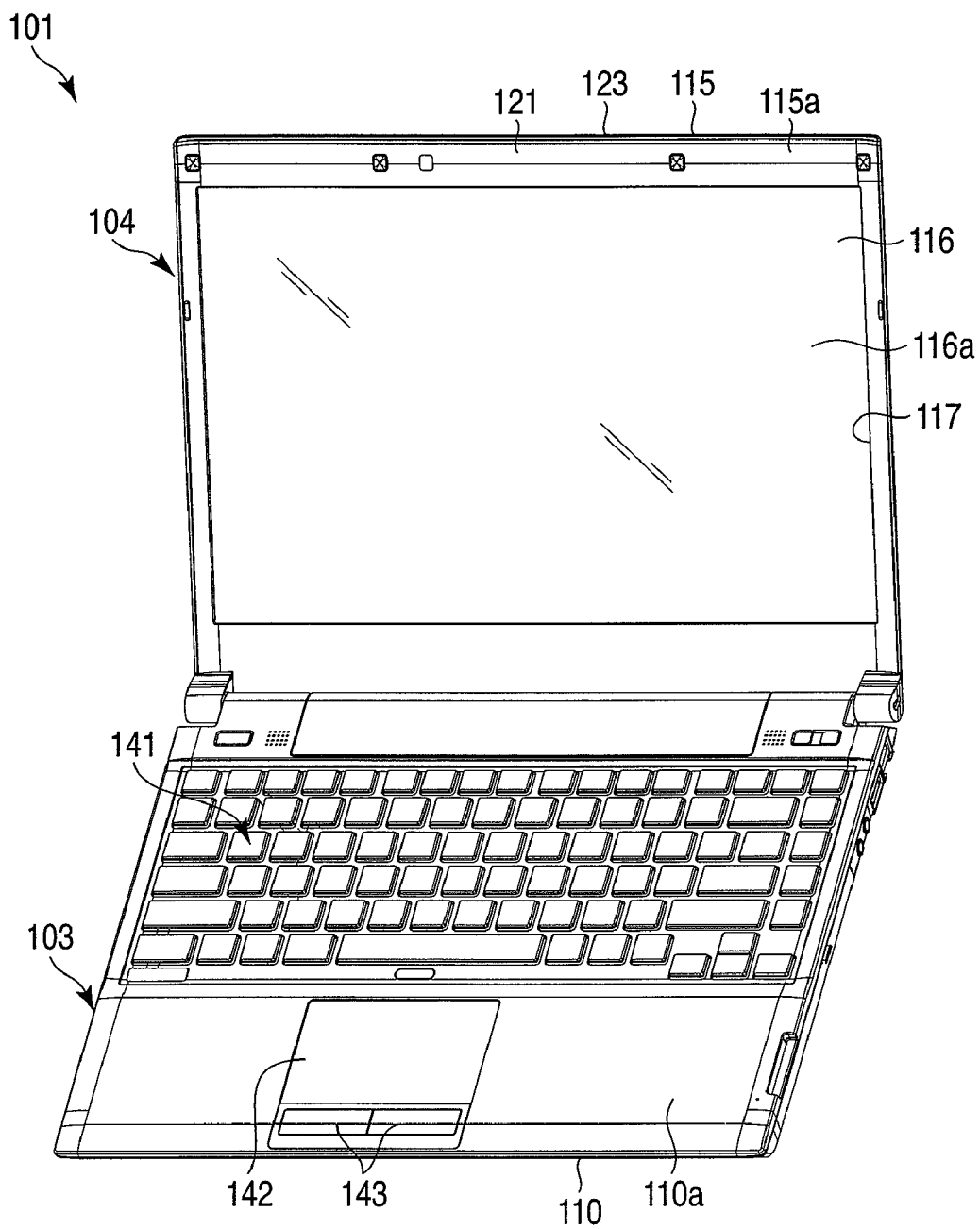
F I G. 14

TELEVISION AND ELECTRONIC APPARATUS

CROSS-REFERENCE TO RELATED APPLICATIONS

This application is based upon and claims the benefit of priority from Japanese Patent Application No 2010-126145, filed Jun. 1, 2010; the entire contents of which are incorporated herein by reference.

FIELD

Embodiments described herein relate generally to a television and an electronic apparatus.

BACKGROUND

Electronic apparatuses such as a television and a portable computer comprise a display module for displaying images. The display module is, for example, a liquid crystal display (LCD) or a plasma display.

The display module is contained in a casing. A plurality of ribs are provided inside the casing in such a manner that the ribs extend along the side faces of the display module. If the display module is dropped and is subject to impact, the ribs serve to receive the display module.

To prevent the display module from damage when it is received by the ribs, a cushion member such as rubber can be attached to the ribs or the display module. The cushion member is located between the ribs and the display module and serves to absorb the impact which the display module may undergo.

The display module comprises a glass panel that covers the display surface on which images are displayed. The glass panel is thin and may be easily broken or damaged when impact is applied. It is therefore desirable that the external force applied to the glass panel be reduced as much as possible.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 14 is an exemplary perspective view of a portable computer according to the fifth embodiment;

DETAILED DESCRIPTION

Various embodiments will be described hereinafter with reference to the accompanying drawings.

In general, according to one embodiment, an electronic apparatus includes a casing, a display module, a first receiving portion and a second receiving portion. The casing includes a first inner face and a second inner face opposed to the first inner face. The display module includes (i) a base portion arranged on the first inner face and received in the casing, and (ii) a panel laid over the base portion and opposed to the second inner face. The first receiving portion protrudes from the first inner face along a side face of the display module. The first receiving portion is opposed to a side face of the base portion and includes a distal end located away from a side face of the panel in a direction toward the first inner face. The second receiving portion is located more away from the display module than the first receiving portion is. The second receiving portion is opposed to the side face of the panel.

A description will now be given of the first embodiment with reference to FIGS. 1 through 4. In this specification, the side nearest the user is defined as the front; that furthest from the user, the rear; that to the left of the user, the left; that to the right of the user, the right; that facing upward relative to the user, up; and that facing downward relative to the user, down.

Figure 1:
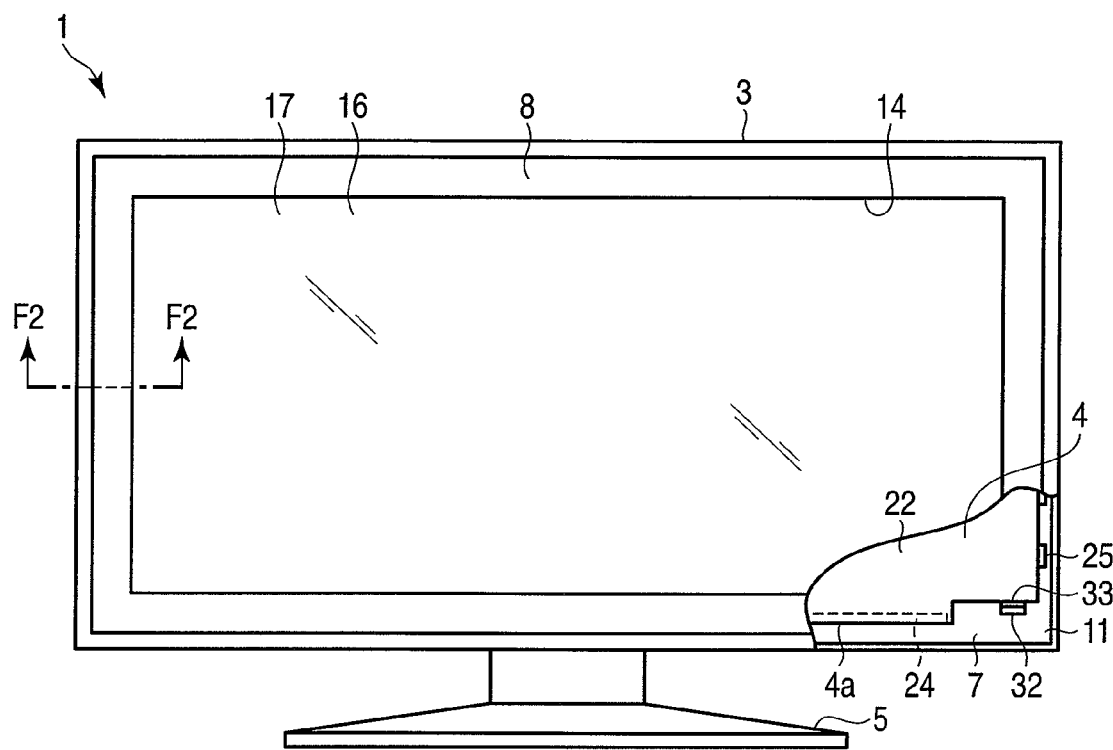
FIG. 1 is an exemplary front view of a television according to the first embodiment.

FIG. 1 is a partially-cutaway front view of a television. The television 1 is an example of an electronic apparatus. The television 1 is liquid crystal television, for example. The television 1 is not limited to the type shown in the drawings and may be another type of television such as a plasma television.

As shown in FIG. 1, the television 1 comprises a casing 3, a display module 4, and a support leg 5. The display module 4 is a liquid crystal display (LCD), for example, and is contained in the casing 3. The support leg supports the casing 3.

Figure 2:
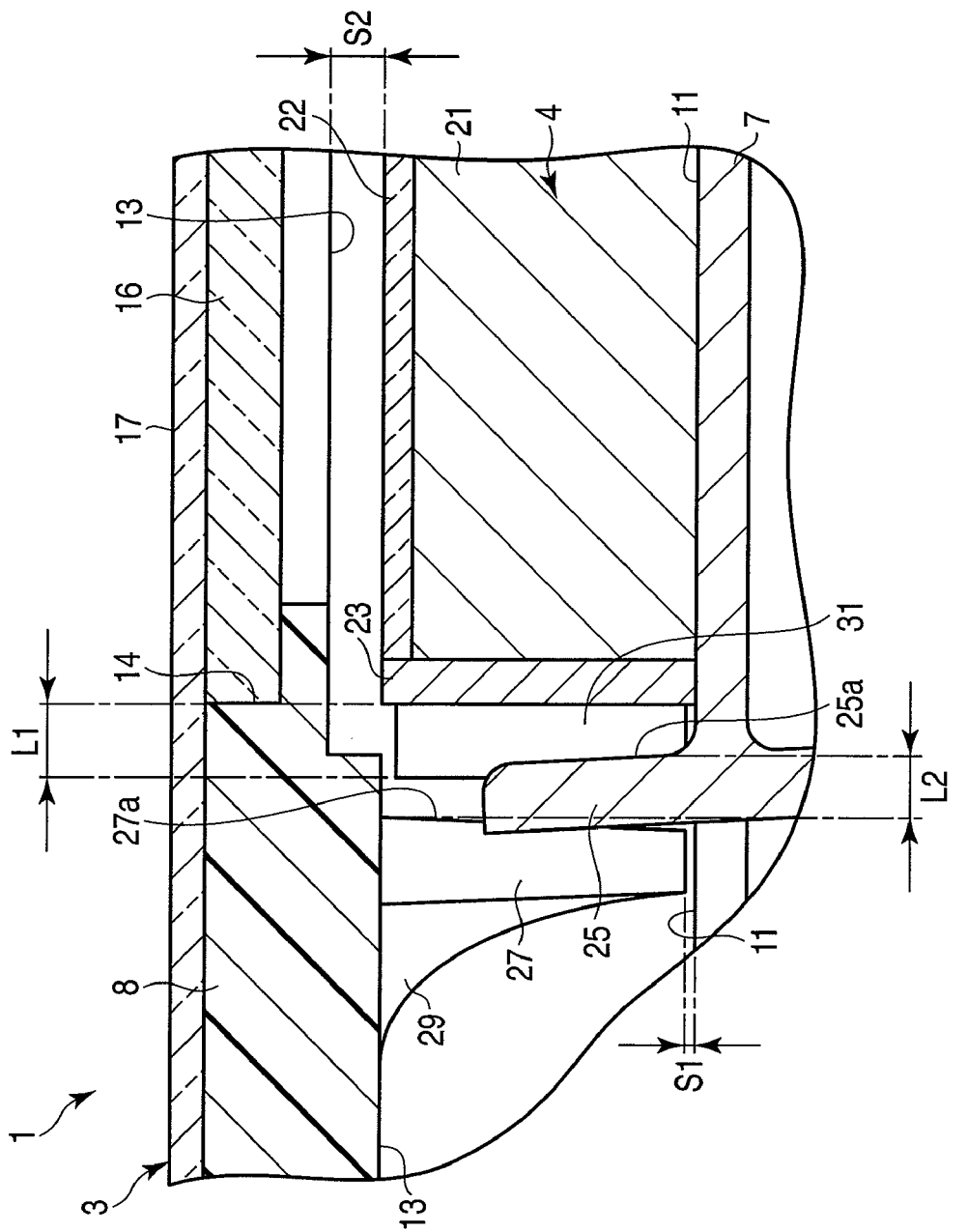
FIG. 2 is an exemplary sectional view taken along line F2-F2 of FIG. 1.

FIG. 2 is a sectional view taken along line F2-F2 of FIG. 1 and showing the internal structure of the television 1. As shown in FIG. 2, the casing 3 comprises an installation member 7 and a cover member 8. The cover member 8 is attached to a base member which forms the rear face of the casing 3. The installation member 7 located between the cover member 8 and the base member.

The installation member 7 is formed of a magnesium alloy, for example. The installation member 7 is not limited to this but may be formed of another kind of material such an aluminum alloy and synthetic resin. The installation member 7 comprises a first inner face 11. The display module 4 is attached to the first inner face 11.

The cover member 8 comprises a second inner face 13. The second inner surface 13 is opposed to the first inner face 11. The cover member 8 comprises an opening section 14. The opening section 14 is opened in the second inner face 13.

The opening section 14 is closed with a cover glass 16. The surface of the cover glass 16 is substantially flush with the outer face of the cover member 8. The cover member 8 and the cover glass 16 are covered with a transparent filter 17.

The display module 4 comprises a base portion 21, a translucent panel 22 and a frame 23. The translucent panel 22 is an example of either a translucent panel or a panel. The base portion 21 is made by a stack of liquid crystal layers and a light source, for example. The base portion 21 is arranged on the first inner face 11.

The translucent panel 22 is a glass panel, example. The translucent panel 22 is laid over the base portion 21 and forms a display face of the display module 4, on which videos are displayed. The translucent panel 22 is opposed to the second face 13 and exposed to the outside of the casing 3 through the opening section 14.

The frame 23 is fitted in the outer peripheral portions of the base portion 21 and the translucent panel 22. The frame 23 fixes the translucent panel 22 to the base portion 21. The frame 23 forms a side face of the display module 4.

As shown in FIG. 1, the display module 4 further comprises a fluorescent tube 24. The fluorescent tube 24 is an example of an electronic component. The fluorescent tube 24 is provided inside the base portion 21 and extends along the lower side face 4a of the display module 4. The lower side face 4a is a lowermost side face of the display module 4. The fluorescent tube 24 is used as a light source of the display module 4.

A plurality of first ribs 25 are provided on the first inner face 11 of the installation member 7. The first ribs 25 are an example of first receiving portions. As shown in FIG. 2, the first ribs 25 protrude from the first inner face 11. The first ribs 25 extend along the right and left side faces of the display module 4. The first ribs 25 are located at positions away from the positions corresponding to the fluorescent tube 24.

The first ribs 25 are opposed to the side faces of the base portion 21 of the display module 4, with the frame 23 being located in between. On the other hand, the first ribs 25 have their distal ends located away from the side faces of the translucent panel 22 in the direction toward the first inner face 11. In other words, the protrusion length of the first ribs 25, as measured from the first inner face 11, is less than the thickness of the base portion 21. The length from the first inner face 11 to the distal ends of the first ribs 25 is less than the thickness of the base portion 21. If the first ribs 25 have their distal ends located away from the side face of the translucent panel 22 in the direction toward the first inner face 11, the first ribs 25 may protrude from the first inner face 11 by a distance more than the thickness of the base portion 21.

A plurality of second ribs 27 are provided on the second inner face 13 of the cover member. The second ribs 27 are an example of second receiving portions. The second ribs 27 protrude from the second inner face 13 toward the first inner face 11. The second ribs 27 are opposed to the side face of the translucent panel 22 of the display module 4, with the frame 23 being located in between.

The second ribs 27 extend along the right and left side faces of the display module 4. As shown in FIG. 2, the second ribs 27 are located more away from the display module 4 than the first ribs 25 are. The first and second ribs 25 and extend along the right and left side surfaces of the display module 4, and are shifted from each other.

The second ribs 27 protrude more than the first ribs 25 do. The protrusion length of the second ribs 27 is far greater than that of the first ribs 25. The protrusion length of the second ribs 27 is greater than the thickness of the display module 4. As shown in FIG. 2, gap S1 between the second rib 27 and the first inner face 11 is narrower than gap S2 between the translucent panel 22 and the second inner face 13.

A plurality of auxiliary ribs 29 are provided for the second ribs 27. The auxiliary ribs 29 extend in the direction away from the display module 4. The auxiliary ribs 29 couple the second ribs 27 to the second inner face 13.

A plurality of elastic cushion members 31 are attached to the frame 23 of the display module 4. As the cushion members 31, a variety of buffering materials made of synthetic rubber, a sponge, cloth, polymer and other shock absorbing materials are used.

The cushion members 31 are located at positions corresponding to the second ribs 27. The cushion members 31 are sandwiched between the side face of the display module 4 and the second ribs 27.

As shown in FIG. 2, thickness L1 of the cushion member 31 is greater than distance L2 between face 25a of the first rib 25 and face 27a of the second rib 27. Face 25a of the first rib 25 and face 27a of the second rib 27 are faces that are opposed to the display module 4.

As shown in FIG. 1, a plurality of third ribs 32 are provided on the first inner face 11 of the installation member 7. The third ribs 32 are located on the upper and lower side faces of the display module 4 and extend along the respective side faces.

The third ribs 32 protrude from the inner face 11 by a distance greater than the thickness of the base member 21. The third ribs 32 are opposed to the side face of the base portion 21 of the display module 4 and the side face of the translucent panel 22.

A damping material 33 is located between the third ribs 32 and the display module 4. The third ribs 32 clamp and hold the display module 4, with the damping material located therebetween.

Clamped and held by the third ribs 32, the display module 4 is attached to the first inner face 11 of the installation member 7. The display module 4 need not be limited to this structure; it may be fixed to the installation by means of screws.

Figure 3:
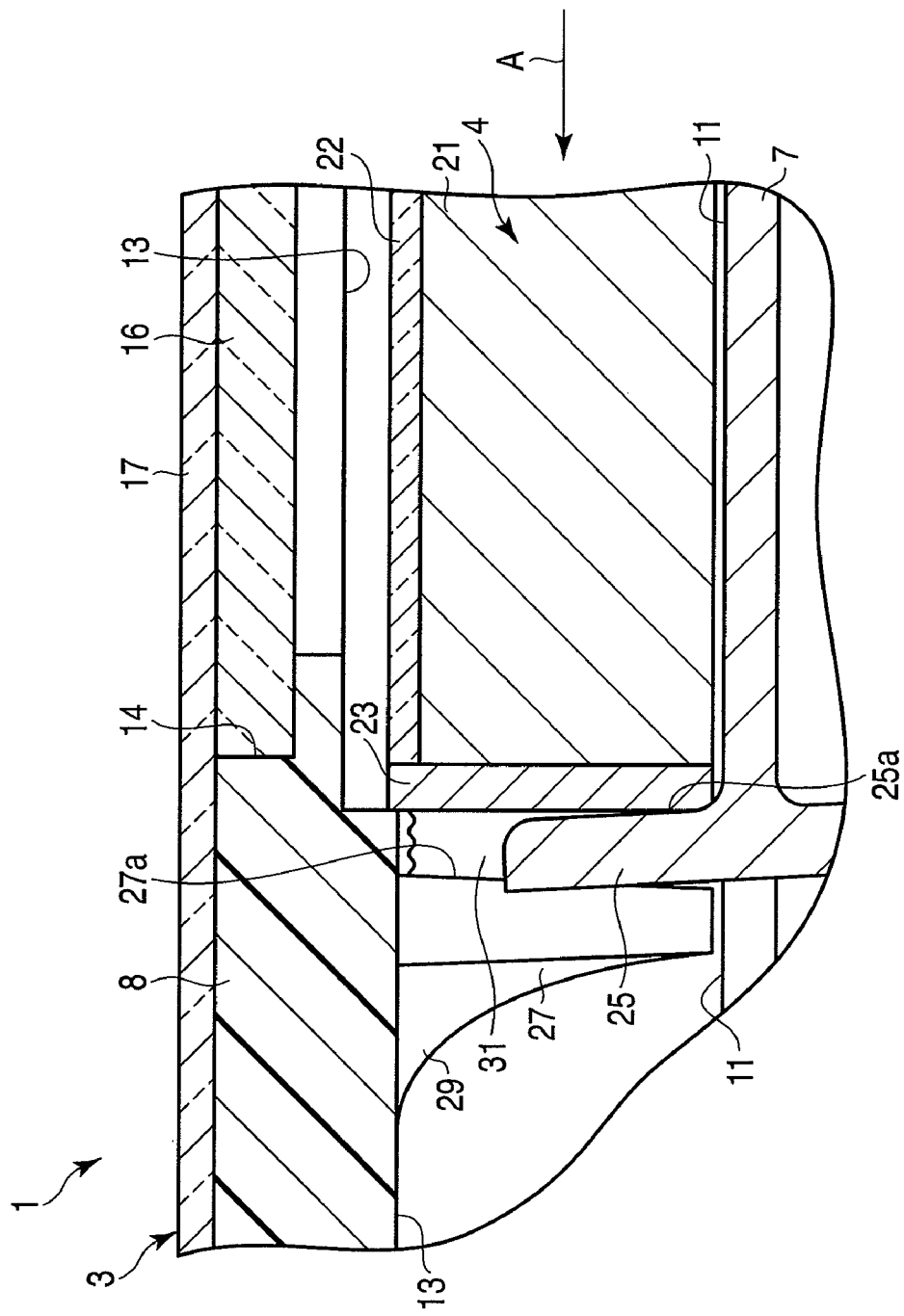
FIG. 3 is an exemplary sectional view illustrating a state where the television of the first embodiment is applied with an impact.

FIG. 3 is a sectional view showing the internal structure of part of the television applied with an impact. When the television is applied with an impact, the display module 4 may move relative to the casing 3, for example, in the direction indicated by arrow A of FIG. 3. Arrow A indicates a leftward direction.

When the display module 4 moves in the direction of arrow A, the cushion members 31 attached to the frame 23 come into contact with the second ribs 27. In other words, the display module 4 is received by the second ribs 27 through the use of the cushion members 31.

Furthermore, the display module 4 is received by the first ribs 25. Since the first ribs 25 have their distal ends located away from the side faces of the translucent panel 22 toward the inner face 11, they receive only the base portion 21 through the use of the frame 23.

In this manner, the base portion 21 of the display module 4 is received by the first ribs 25 through the use of the frame 23, and is received by the second ribs 27 through the use of the frame 23 and the cushion members 31. On the other hand, the translucent panel 22 of the display module 4 is received only by the second ribs 27 through the use of the frame 23 and the cushion members 31.

Figure 4:
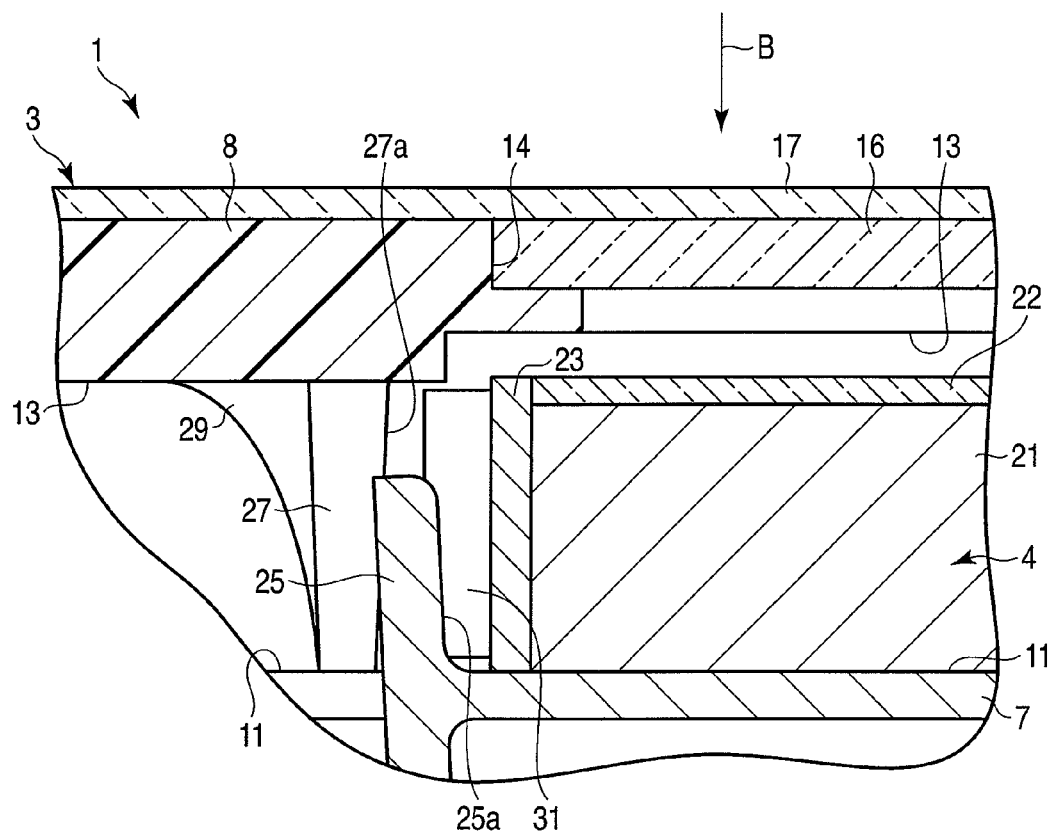
FIG. 4 is an exemplary sectional view illustrating a state where a cover member used in the first embodiment is applied with an external force.

FIG. 4 is a sectional view of part of the television 1 and illustrates a state where the cover member 8 is applied with an external force. For example, when the cover member 8 is applied with an external force acting in the direction indicated by arrow B of FIG. 4, the cover member 8 is deformed in the direction indicated by arrow B of FIG. 4. Arrow B indicates a rearward direction.

When the cover member 8 is deformed, the second ribs 27 come into contact with the first inner face 11 of the installation member 7. When coming into contact with the first inner face 11, the second ribs 27 support the cover member 8. In this case, a gap is formed between the translucent panel 22 and the second inner face 13.

The television 1 of the above-mentioned structure is advantageous in that when the television 1 is applied with an impact, the first ribs 25 and the second ribs 27 serve to receive the display module 4. Accordingly, the external force exerted on the display module 4 is distributed.

The translucent panel 22 is received only by the second ribs 27 through the use of the cushion members. An external force applied to the translucent panel 22 is distributed among the first ribs 25 and absorbed by the cushion members 31. In this manner, the external force exerted on the translucent panel 22 is reduced.

Furthermore, when the external force is applied to the cover member 8, the second ribs 27 come into contact with the first inner face 11 and support the cover member 8. At the time, the translucent panel 22 is kept separate from the second inner face 13. With this structure, the translucent panel 22 is prevented from bumping into the cover member 8 or damaged thereby. In this manner, damage to the display module 4 is prevented.

A description will now be given of the second embodiment with reference to FIGS. 5 through 7. In the descriptions below, the same reference numerals will be used to denote components corresponding or similar to those of the television of the first embodiment, and a detailed description of such components will be omitted.

Figure 5:
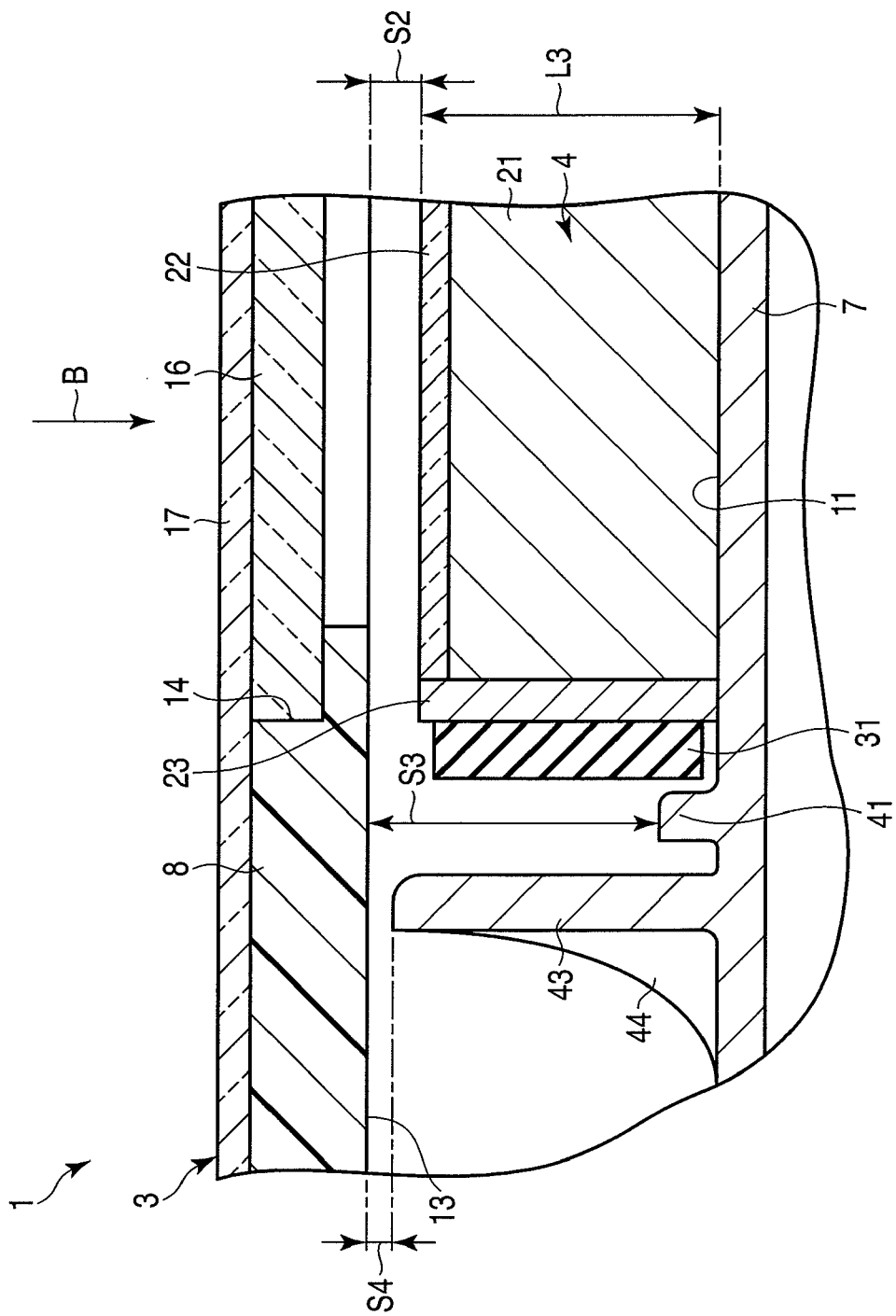
FIG. 5 is an exemplary sectional view showing part of a television according to the second embodiment.

FIG. 5 is a sectional view of the internal structure of part of the television 1 according to the second embodiment. As shown in FIG. 5, a plurality of first ribs 41 are provided on a first inner face 11 of an installation member 7. The first ribs 41 are an example of first receiving portions.

The first ribs 41 protrude from the first inner face 11. The first ribs 41 extend along the right and left side faces of the display module 4. The first ribs 41 are located at positions away from the positions corresponding to a fluorescent tube 24.

The first ribs 41 are opposed to the side faces of a base portion 21 of a display module 4, with a frame 23 being located in between. On the other hand, the first ribs 41 have their distal ends located away from the side faces of the translucent panel 22 in the direction toward a first inner face 11. In other words, the protrusion length of the first ribs 41, as measured from the first inner face 11, is less than the thickness of the base portion 21.

The length from the first inner face 11 to the distal ends of the first ribs 41 is less than the thickness of the base portion 21. As shown in FIG. 5, gap S3 between the first rib 41 and the second inner face 13 is greater than thickness L3 of the display module 4.

A plurality of second ribs 43 are provided on the first inner face 11 of the installation member 7. The second ribs 43 are an example of second receiving portions. The second ribs 43 protrude from the first inner face 11 toward the second inner face 13. In other words, the second ribs 43 extend toward the second inner face 13.

The second ribs 43 extend along the right and left side faces of the display module 4. The second ribs 43 are located more away from the display module 4 than the first ribs 41 are.

The second ribs 43 protrude more than the first ribs 41 do. The protrusion length of the second ribs 43 is greater than the thickness L3 of the display module 4. As shown in FIG. 5, gap S4 between the second rib 43 and the second inner face 13 is narrower than gap S2 between the translucent panel 22 and the second inner face 13. The second ribs 43 are opposed to the side faces of the translucent panel 22 of the display module 4, with the frame 23 being located in between.

A plurality of auxiliary ribs 44 are provided for the second ribs 43. The auxiliary ribs 44 extend from the second ribs 43 in the direction away from the display module 4. The auxiliary ribs 44 couple the second ribs 43 to the second inner face 13.

A plurality of elastic cushion members 31 are attached to the frame 23 of the display module 4. The cushion members 31 are sandwiched between the display module 4 and the first ribs 41. In addition, the cushion members 31 are sandwiched between the display module 4 and the second ribs 43.

Figure 6:
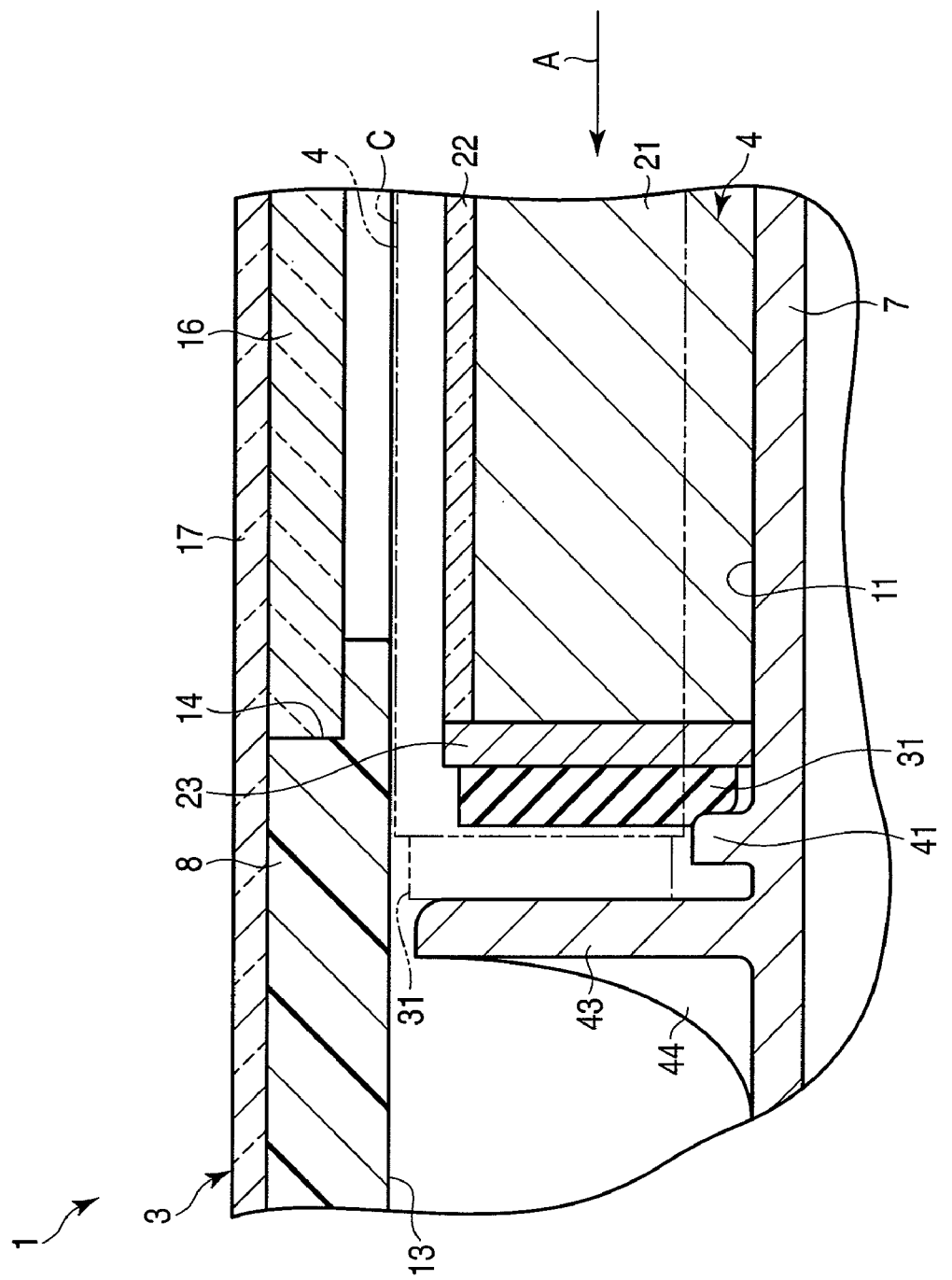
FIG. 6 is an exemplary sectional view illustrating a state where a television of the second embodiment is applied with an impact.

FIG. 6 is a sectional view showing the internal structure of part of the television 1 applied with an impact. When the television is applied with an impact, the display module 4 may move, for example, in the direction indicated by arrow A of FIG. 6.

When the display module 4 moves in the direction of arrow A, the cushion members 31 attached to the frame 23 come into contact with the first ribs 41. In other words, the display module 4 is received by the first ribs 41 through the use of the cushion members 31. Since the first ribs 41 have their distal ends located away from the side faces of the translucent panel 22 toward the first inner face 11, they receive only the base portion 21 through the use of the frame 23 and the cushion members 31.

If an impact applied to the television 1 is very strong, the display module 4 received by the first ribs 41 may move onto the first ribs 41. The two-dot-dash line C shown in FIG. 6 indicates how the display module 4 and the cushion member 31 move onto the first rib 41.

The cushion members 31 attached to the frame 23 come into contact with the second ribs 43. In other words, the display module 4 is received by the second ribs 43 through the use of the cushion members 31.

In this manner, the base portion 21 of the display module 4 is received by the first ribs 41 and the second ribs 43 through the use of the frame 23 and cushion members 31. On the other hand, the translucent panel 22 of the display module 4 is received only by the second ribs 27 through the use of the frame 23 and the cushion members 31.

When the cover member 8 is applied with an external force acting in the direction indicated by arrow B of FIG. 5, the cover member 8 is deformed in the direction indicated by arrow B. When the cover member 8 is deformed, the second ribs 43 come into contact with the second inner face 13 of the cover member 8. When coming into contact with the second inner face 13, the second ribs 43 support the cover member 8. In this case, a gap is formed between the translucent panel 22 and the second inner face 13.

The television 1 of the above-mentioned structure is advantageous in that when the television 1 is applied with an impact, the first ribs 41 serve to receive the display module 4. Even when the impact applied to the television 1 is very strong, the second ribs 43 receive the display module 4.

The translucent panel 22 of the display module 4 is received only by the second ribs 43 through the use of the cushion members 31. The external force exerted on the display module 4 is smaller when the display module 4 is received by the second ribs 43 than when it is received by the first ribs 41. Accordingly, the external force exerted on the translucent panel 22 is reduced.

When the cover member 8 is applied with an external force, the second ribs 43 come into contact with the second inner face 13 and support the cover member 8. At the time, the translucent panel 22 is kept separate from the second inner face 13. With this structure, the translucent panel 22 is prevented from bumping into the cover member 8 or damaged thereby. In this manner, damage to the display module 4 is prevented.

Figure 7:
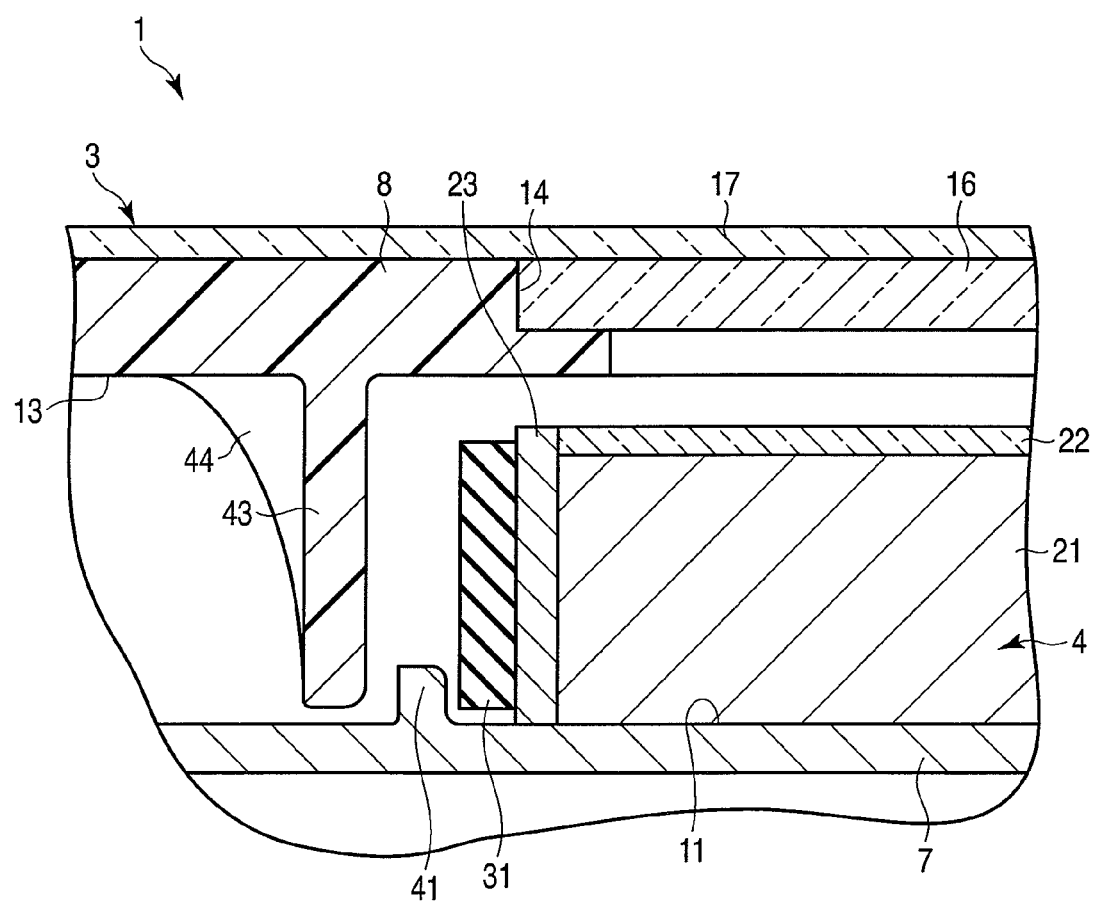
FIG. 7 is an exemplary sectional view showing a modification of the television of the second embodiment.

FIG. 7 is a sectional view showing a modification of the second embodiment. In the television 1 shown in FIG. 7 the second ribs 43 protrude from the second inner face 13. This modification achieves functions and advantages that are similar to those of the second embodiment.

A description will now be given of the third embodiment with reference to FIGS. 8 and 9. In the descriptions below, the same reference numerals will be used to denote components corresponding or similar to those of the televisions of the first and second embodiments, and a detailed description of such components will be omitted.

Figure 8:
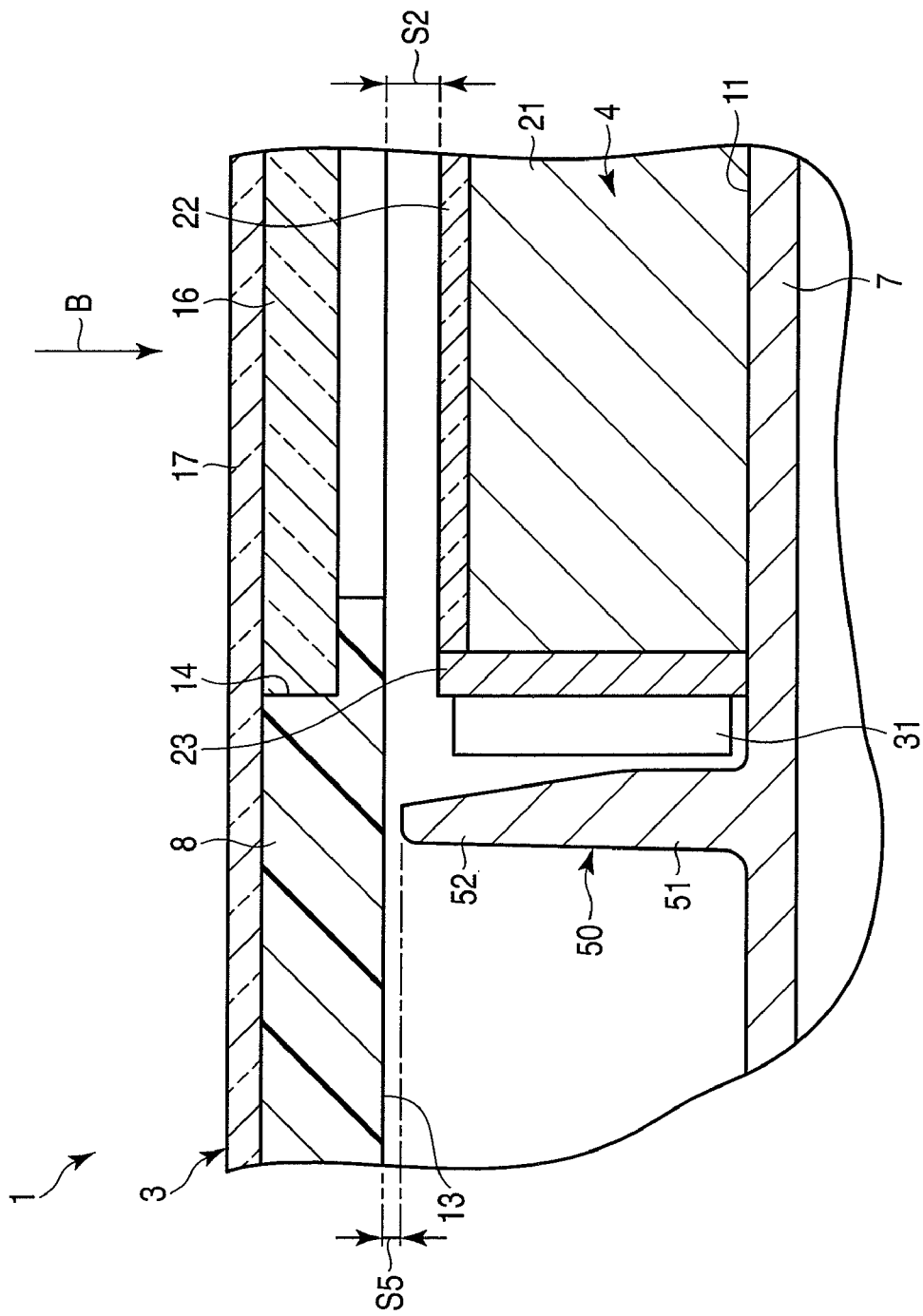
FIG. 8 is an exemplary sectional showing part of a television according to the third embodiment.

FIG. 8 is a sectional view of the internal structure of part of the television 1 according to the third embodiment. As shown in FIG. 8, a plurality of first slanted ribs 50 are provided on a first inner face 11 of an installation member 7. The first slanted ribs 50 include first portions 51 and second portions 52. The first portions 51 are an example of the first receiving portions, and the second portions 52 are an example of the second receiving portions.

The first slanted ribs 50 extend along the right and left side faces of a display module 4. The first slanted ribs 50 are located at positions away from the positions corresponding to a fluorescent tube 24.

The first portions 51 protrude from the first inner face 11. The first portions 51 are opposed to the side faces of the base portion 21 of the display module 4, with a frame 23 being located in between. On the other hand, the first portions 51 have their distal ends located away from the side face of the translucent panel 22 in the direction toward a first inner face 11. In other words, the protrusion length of the first portions 51, as measured from the first inner face 11, is less than the thickness of the base portion 21.

The second portions 52 protrude from the distal ends of the first portions 51 toward the second inner face 13. In other words, the second portions 52 extend toward the second inner face 13. The second portions 52 are slanted in a direction away from the display module 4. Therefore, the second portions 52 are located more away from the display module 4 than the first portions 51 are. The second portions 52 are thinner than the first portions 51.

As shown in FIG. 8, gap S5 between the second portion 52 and the second inner face 13 is narrower than gap S2 between the translucent panel 22 and the second inner face 13. The second portions 52 are opposed to the side faces of the translucent panel 22 of the display module 4, with the frame 23 being located in between.

A plurality of elastic cushion members 31 are attached to the frame 23 of the display module 4. The cushion members 31 are sandwiched between the display module 4 and the slanted ribs 50.

Figure 9:
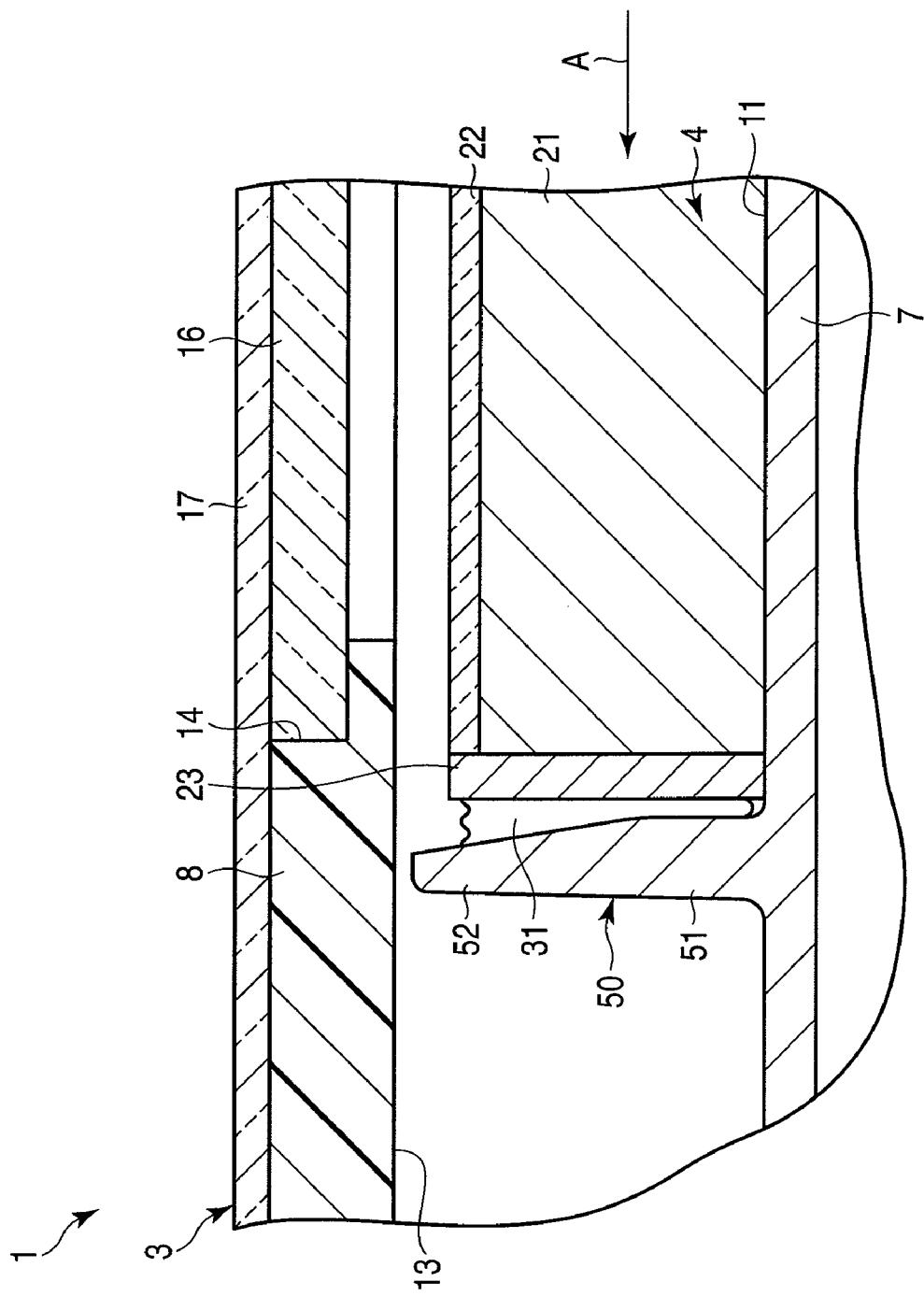
FIG. 9 is an exemplary sectional view illustrating a state where the television of the third embodiment is applied with an impact.

FIG. 9 is a sectional view showing the internal structure of the television 1 applied with an impact. When the television 1 is applied with an impact, the display module 4 may move, for example, in the direction indicated by arrow A of FIG. 9.

When the display module 4 moves in the direction of arrow A, the cushion members 31 attached to the frame 23 come into contact with the first portions 51. In other words, the display module 4 is received by the first portions 51 through the use of the cushion members 31. Since the first portions 51 have their distal ends located away from the side faces of the translucent panel 22 toward the first inner face 11, they receive only the base portion 21 through the use of the frame 23 and the cushion members 31.

If an impact applied to the television 1 is very strong, the display module 4 received by the first portions 51 may move further in the direction indicated by arrow A. Accordingly, the cushion members 31 come into contact with the second portions 52. In other words the display module 4 is received by the second ribs 52 through the use of the cushion members 31. At the time, the second portions 52 receive the base member 21 and the translucent panel 22 through the use of the frame 23 and the cushion members 31.

In this manner, the base portion 21 of the display module 4 is received by the first portions 51 and the second portions 52 through the use of the frame 23 and cushion members 31. On the other hand, the translucent panel 22 of the display module 4 is received only by the second portions 52 through the use of the frame 23 and the cushion members 31.

When the cover member 8 is applied with an external force acting in the direction indicated by arrow B of FIG. 8, the cover member 8 is deformed in the direction indicated by arrow B. When the cover member 8 is deformed, the second portions 52 come into contact with the second inner face 13 of the cover member 8. When coming into contact with the second inner face 13, the second portions 52 support the cover member 8. In this case, a gap is formed between the translucent panel 22 and the second inner face 13.

The television 1 of the above-mentioned structure is advantageous in that when the television 1 is applied with an impact, the first portions 51 serve to receive the display module 4. Even when the impact applied to the television 1 is very strong, the second portions 52 receive the display module 4.

The translucent panel 22 is received only by the second portions 52 through the use of the cushion members 31. The external force exerted on the display module 4 is smaller when the display module 4 is received by the second portions 52 than when it is received by the first portions 51. Accordingly, the external force exerted on the translucent panel 22 is reduced.

When the cover member 8 is applied with an external force, the second portions 52 come into contact with the second inner face 13 and support the cover member 8. At the time, the translucent panel 22 is kept separate from the second inner face 13. With this structure, the translucent panel 22 is prevented from bumping into the cover member 8 or damaged thereby. In this manner, damage to the display module 4 is prevented.

A description will now be given of the fourth embodiment with reference to FIG. 10 through FIG. 13. In the descriptions below, the same reference numerals will be used to denote components corresponding or similar to those of the television 1 of the first embodiment, and a detailed description of such components will be omitted.

Figure 10:
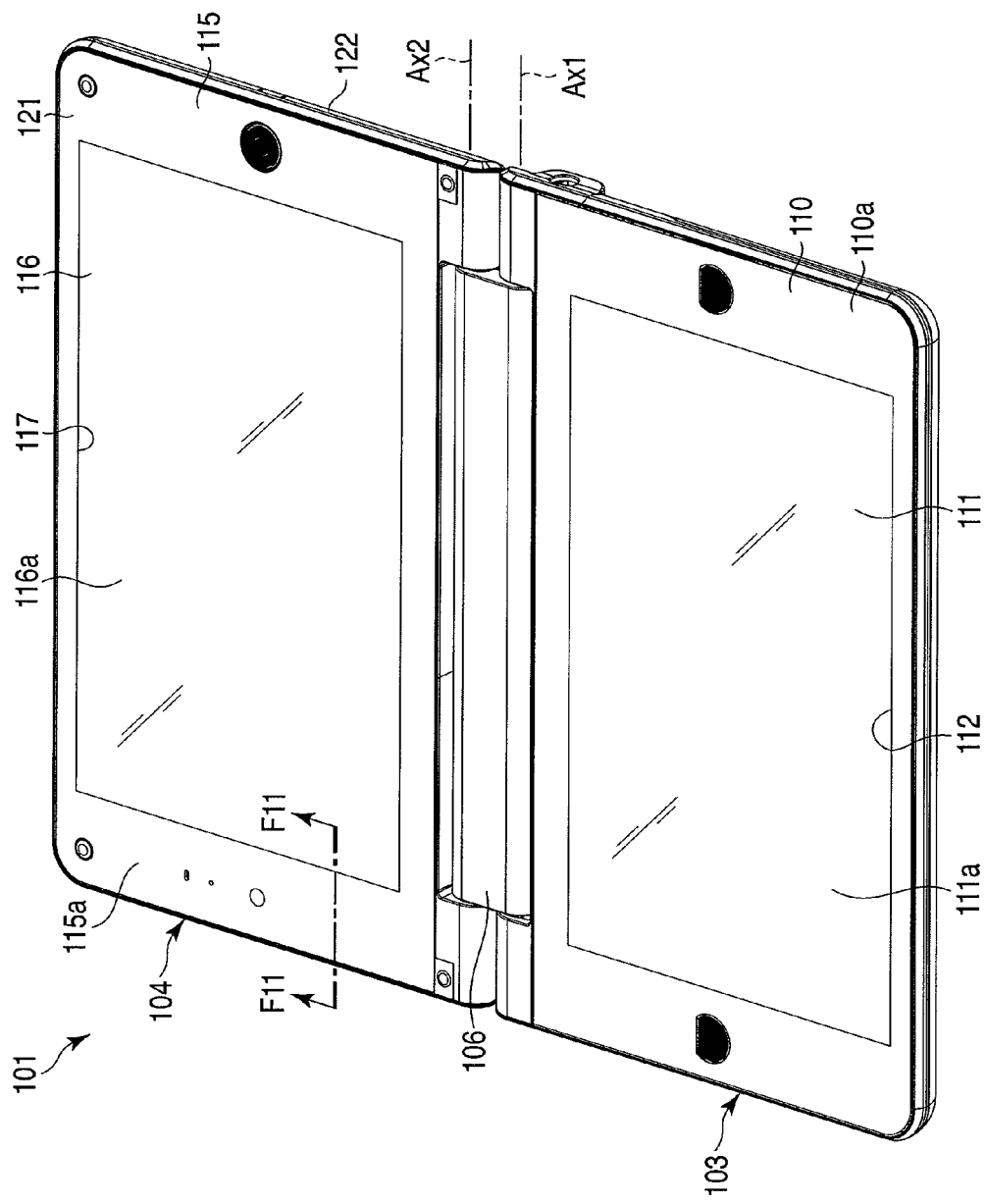
FIG. 10 is an exemplary perspective view of a portable computer according to the fourth embodiment.

FIG. 10 is a perspective view of a portable computer 101. The portable computer 101 is an example of an electronic apparatus. As shown in FIG. 10, the portable computer 101 comprises a first unit 103 and a second unit 104.

The first unit 103 and the second unit 104 are coupled together by means of a hinge mechanism 106. The hinge mechanism 106 is coupled to an end portion of the first unit 103 in such a manner as to enable rotation around a first Ax1. The hinge mechanism 106 is coupled to an end portion of the second unit 104 in such a manner as to enable rotation around a second axis Ax2. The first axis Ax1 and the second axis Ax2 extend in parallel to each other.

The first unit 103 and the second unit 104 are rotatable relative to each other, between an expanded state (shown in FIG. 10) and a folded state (not shown). In the expanded state, the second unit 104 is adjacent to the first unit 103. In the folded state, the second unit 104 is laid on the first unit 103.

The first unit 103 comprises a flat box-like first casing 110 and a touch screen module 111. The touch screen module 111 is formed, for example, by laving a transparent touchpanel 111a on the display section of a liquid display. The touch screen module 111 is contained in a first casing 110.

A first opening section 112 is provided on the inner surface 110a of the first casing 110. In the folded state, the inner surface 110a is opposed to the second unit 104. The first opening section 112 permits the touchpanel 111a to be exposed to the outside of the first unit 103.

The second unit 104 comprises a flat box-like second casing 115 and a display module 116. The second casing 115 is an example of a casing. The display module 116 is a liquid crystal display, for example. The display module 116 is contained in the second casing 115.

A second opening section 117 is formed in the inner surface 115a of the second casing 115. In the folded state, the inner surface 115a is opposed to the first unit 103. The second opening section 117 permits the screen 116a of the display module 116 to be exposed to the outside of the second unit 104.

Figure 11:
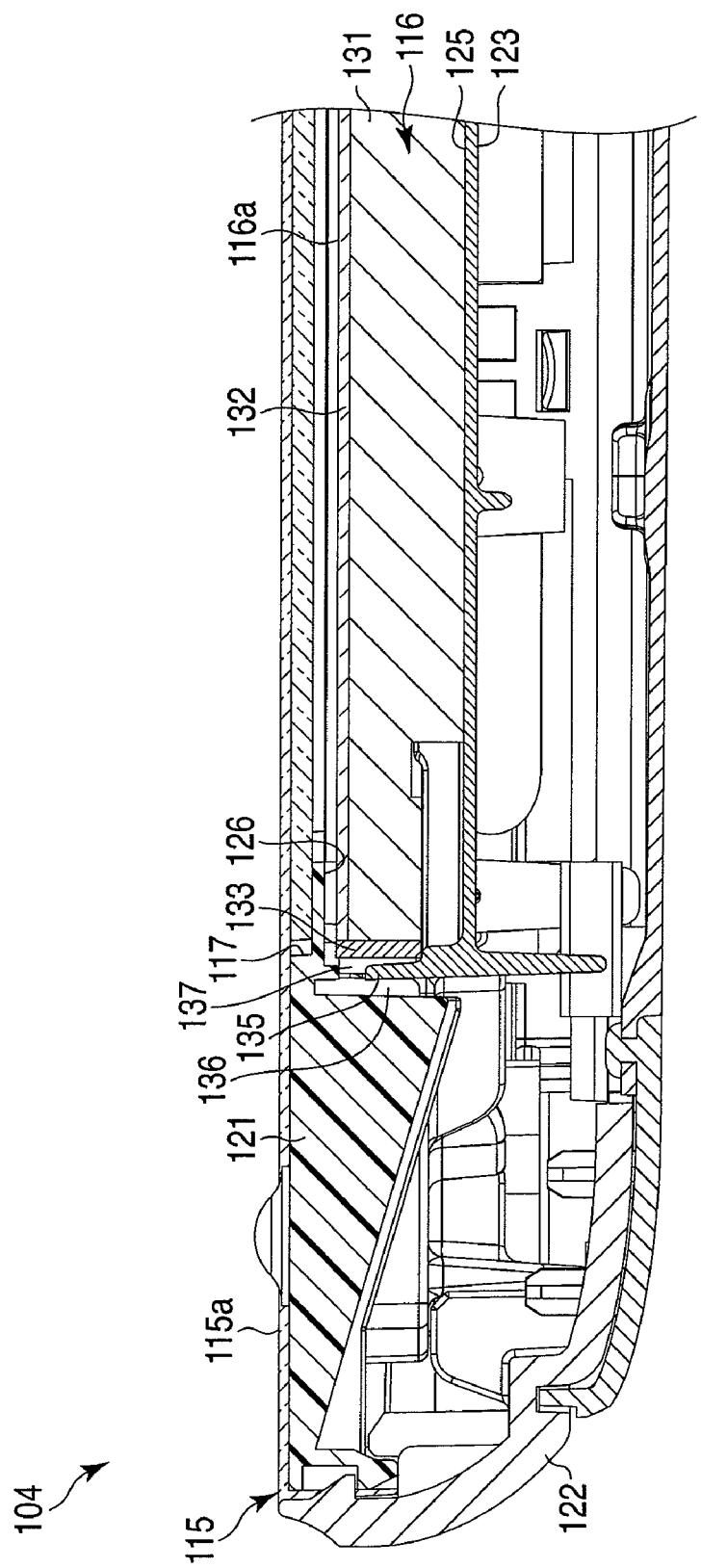
FIG. 11 is an exemplary sectional view of the portable computer, taken along line F11-F11 of FIG. 10.

FIG. 11 is a sectional view showing part of the second unit 104 taken along line F11-F11 of FIG. 10. As shown in FIG. 11, the second casing 115 comprises a cover member 121, a base member 122 and an installation member 123.

The cover member 121 covers the base member 122 and is attached to it. The installation member 123 is attached to the base member 122 and is located between the cover member 121 and the base member 122.

The installation member 123 comprises a first inner face 125. The first inner face 125 is opposed to the cover member 121. A display module 116 is attached to the first inner face 125.

The cover member 121 comprises a second inner face 126. The second inner face 126 is opposed to the first inner face 125 in the state where the display module 116 is located therebetween. The second opening section 117 is provided in the second inner face 126.

The display module 116 comprises a base portion 131, a panel 132 and a frame 133. The base portion 131 is made of a stack of liquid crystal layers and a light source. The base portion 131 is contained in the second casing 115 and is laid on the first inner face 125.

The panel 132 is a glass panel, for example. The panel 132 is laid over the base portion 131 and forms a screen 116a of a display module 116. The panel 132 is opposed to the second inner face 126 and exposed to the outside of the second casing 115 through the second opening section 117.

The frame 133 is fitted in the outer peripheral portions of the base portion 131 and the panel 132. The frame 133 fixes the panel 132 to the base portion 131. The frame 133 forms a side face of the display module 116.

Figure 12:
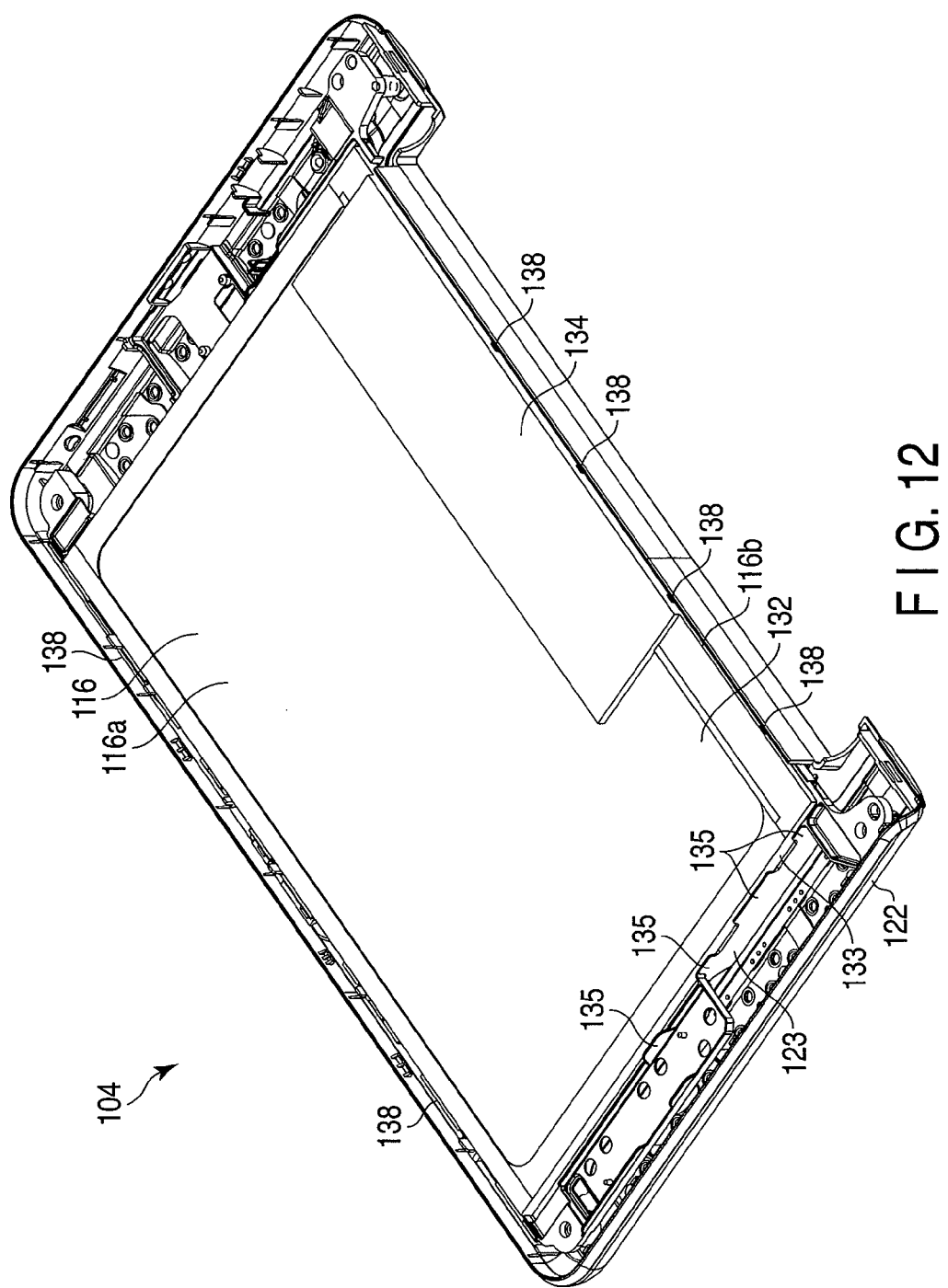
FIG. 12 is an exemplary perspective view illustrating a state where a cover member is removed from a second unit used in the fourth embodiment.

FIG. 12 is a perspective view illustrating a state where the cover member 121 is removed from the second unit 104. As shown in FIG. 12, the display module 116 further comprises a circuit board 134. The circuit board 134 is an example of an electronic component. The circuit board 134 extends along the lower side face 116b of the display module 116. The lower side face 116b is a side face of the display module 116 that is opposed to the hinge mechanism 106. The circuit board 134 is connected to the base portion 131 and controls the display module 116, for example.

Figure 13:
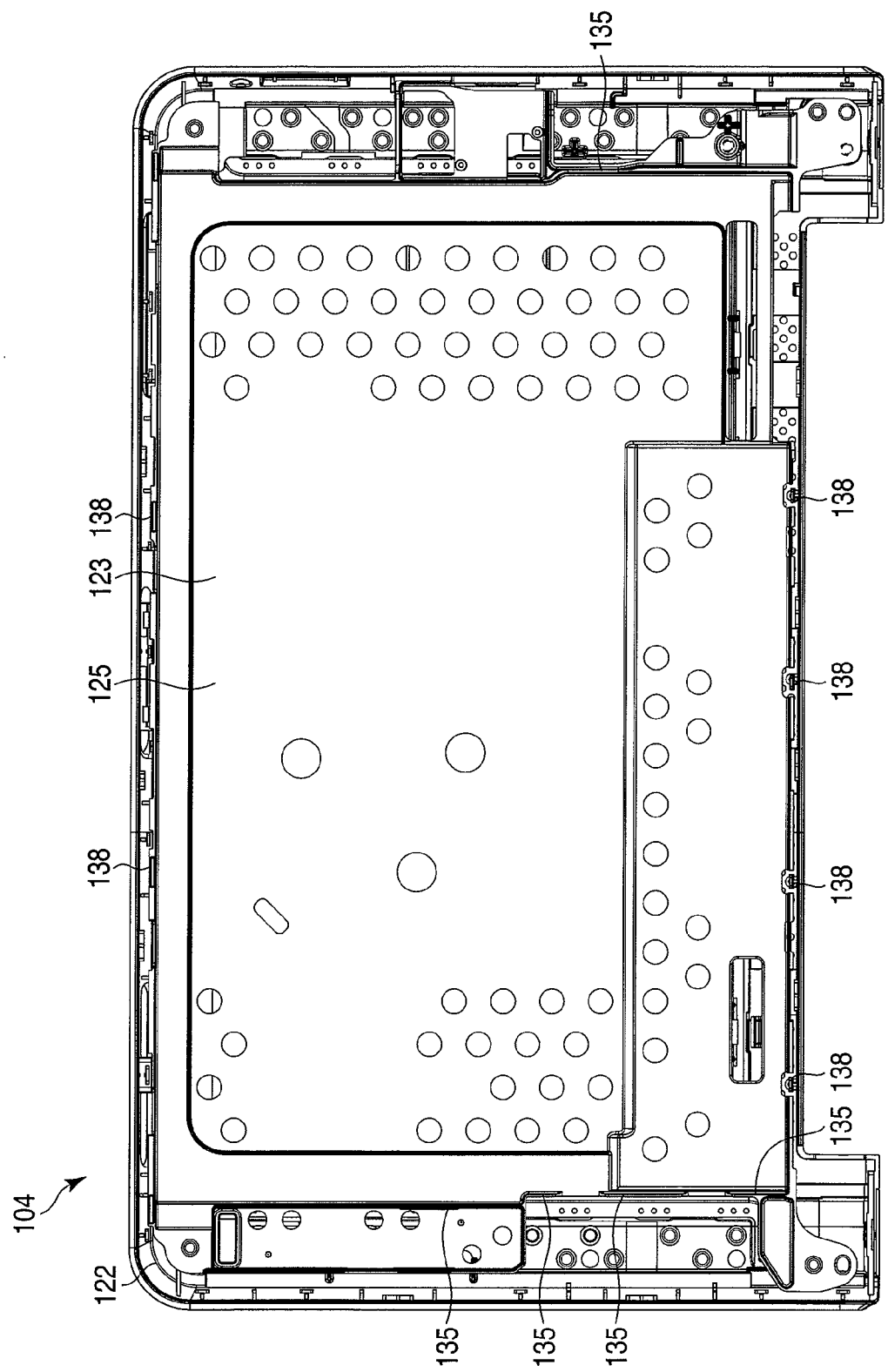
FIG. 13 is an exemplary plan view showing a base member and an installation member used in the fourth embodiment.

FIG. 13 is a plan view of the base member 122 and the installation member 123. A plurality of first ribs 135 are provided on the first inner face 125 of the installation member 123. The first ribs 135 are an example of first receiving portions.

The first ribs 135 protrude from the first inner face 125. As shown in FIG. 12, the first ribs 135 extend along the right and left side faces of the display module 116. Therefore, the first ribs 135 are located at positions away from the positions corresponding to the circuit board 134.

As shown in FIG. 11, the first ribs 135 are opposed to the side faces of the base portion 131 of the display module 116, with the frame 133 being located in between. On the other hand, the first ribs 135 have their distal ends located away from the side faces of the panel 132 in the direction toward the first inner face 125. In other words, the protrusion length of the first ribs 135, as measured from the first inner face 125, is less than the thickness of the base portion 131.

The length from the first inner face 125 to the distal ends of the first ribs 135 is less than the thickness of the base portion 131. If the first ribs 135 have their distal ends located away from the side faces of the panel 132 in the direction toward the first inner face 125, the first ribs 135 may protrude from the first inner face 125 by a distance more than the thickness of the base portion 131

A plurality of second ribs 136 are provided on the second inner face 126 of the cover member 121. The second ribs 136 are an example of second receiving portions. The second ribs 136 protrude from the second inner face 126 toward the first inner face 125. The second ribs 136 are opposed to the side face of the panel 132 of the display module 116, with the frame 133 being located in between.

The second ribs 136 extend along the right and left side faces of the display module 116. As shown in FIG. 11, the second ribs 136 are located more away from the display module 116 than the first ribs 135 area. The first ribs 135 and the second ribs 136 extend along the right and left side surfaces of the display module 116, and are separated from each other.

The second ribs 136 protrude more than the first ribs 135 do. The protrusion length of the second ribs 136 is greater than the thickness of the display module 116. The gap between the second rib 136 and the first inner face 125 is narrower than the gap between the panel 132 and the second inner face 126.

A plurality of elastic cushion members 137 are attached to the frame 133 of the display module 116. As the cushion members 137, a variety of buffering materials made of synthetic rubber, a sponge, cloth, polymer and other shock absorbing materials are used.

The cushion members 137 are located at positions corresponding to the second ribs 136. The cushion members 137 are sandwiched between the side face of the display module 116 and the second ribs 136. When the side faces of the display module 116 come into contact with the first ribs 135, the cushion members 137 come into contact with the second ribs 136.

As shown in FIG. 13, a plurality of third ribs 138 are provided on the first inner face 125 of the installation member 123. The third ribs 138 are located on the upper and lower side faces of the display module 116 and extend along the respective side faces. A damping material is inserted between the third ribs 138 and the display module 116. The third ribs 138 clamp and hold the display module 116, through the use of the damping material.

When the portable computer 101 is applied with an impact, the display module 116 may move relative to the second casing 115. For example, if the display module 116 moves rightward or leftward, the display module 116 is received by the second ribs 136 through the use of the cushioning members 137. The first ribs 135 receive only the base portion 131 through the use of the frame 133.

If the cover member 121 is pressed, it may be deformed. If the cover member 121 is deformed, the second ribs 136 come into contact with the first inner face 125 of the installation member 123. Since the second ribs 136 support the cover member 121, a gap is formed between the panel 132 and the second inner face 126.

When the portable computer 101 is applied with an impact, the first ribs 135 and the second ribs 136 serve to receive the display module 116, as in the television 1 of the first embodiment. Accordingly, the external force exerted on the display module 116 is distributed. In addition, the external force exerted on the panel 132 is reduced.

When the cover member 121 is applied with an external force, the second ribs 136 support the cover member 121. At the time, the panel 132 is prevented from bumping into the cover member 121 or damaged thereby. In this manner, damage to the display module 116 is prevented.

A description will now be given of the fifth embodiment with reference to FIGS. 14 through 17. In the descriptions below, the same reference numerals will be used to denote components corresponding or similar to those of the television 1 of the first embodiment or the portable computer 101 of the fourth embodiment, and a detailed description of such components will be omitted.

FIG. 14 is a perspective view of a portable computer 101 according to the fifth embodiment. As shown in FIG. 14, a first unit 103 comprises a keyboard 141, a trackpad 142 and a pair of buttons 143.

Figure 15:
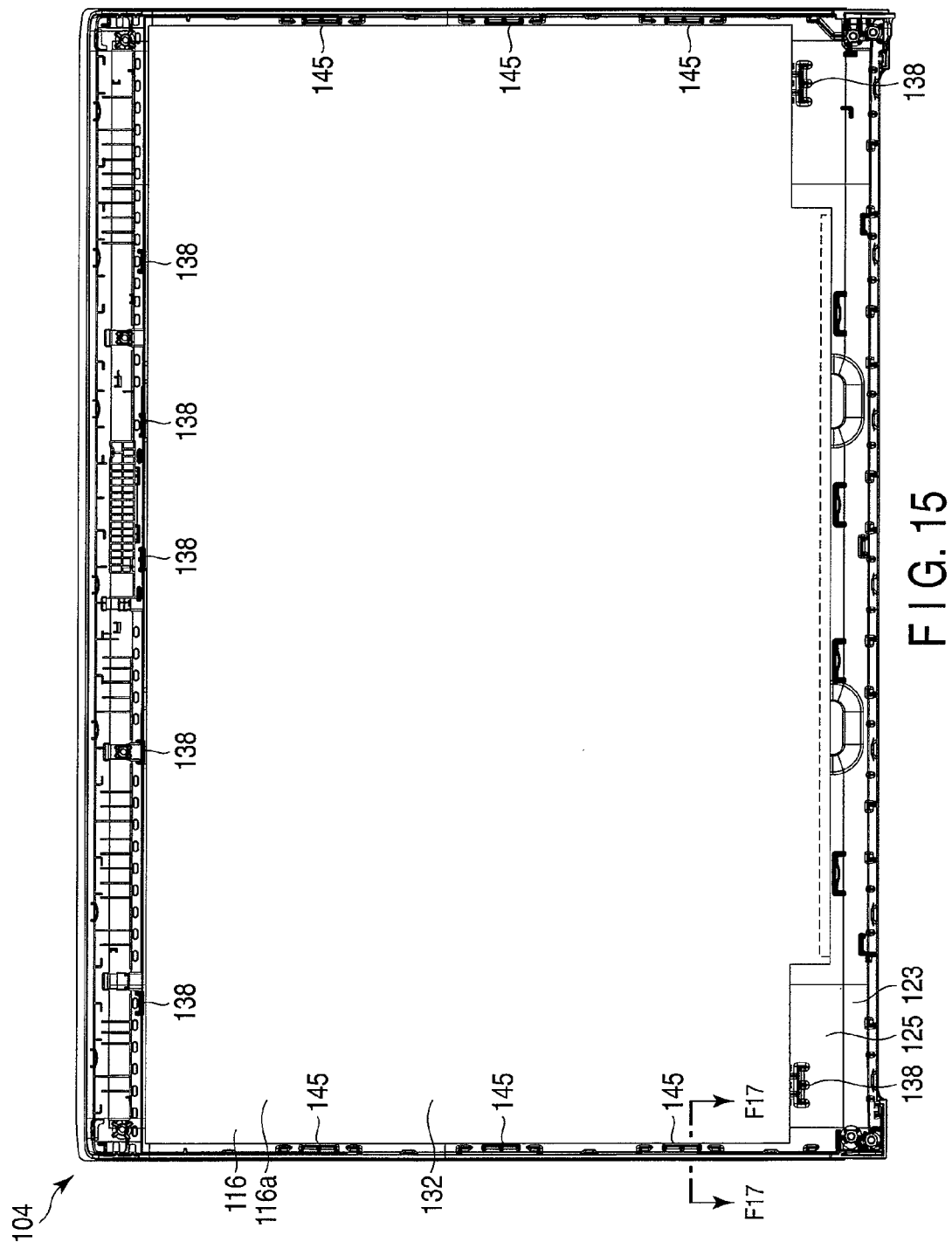
FIG. 15 is an exemplary plan view illustrating a state where a cover member is removed from a second unit used in the fifth embodiment.

FIG. 15 is a plan view illustrating a state where a cover member 121 is removed from a second unit 104. As shown in FIG. 15, a display module 116 is attached to an installation member 123. The installation member 123 of the present embodiment also has a function similar to that of the base member 122 of the fourth embodiment.

Figure 16:
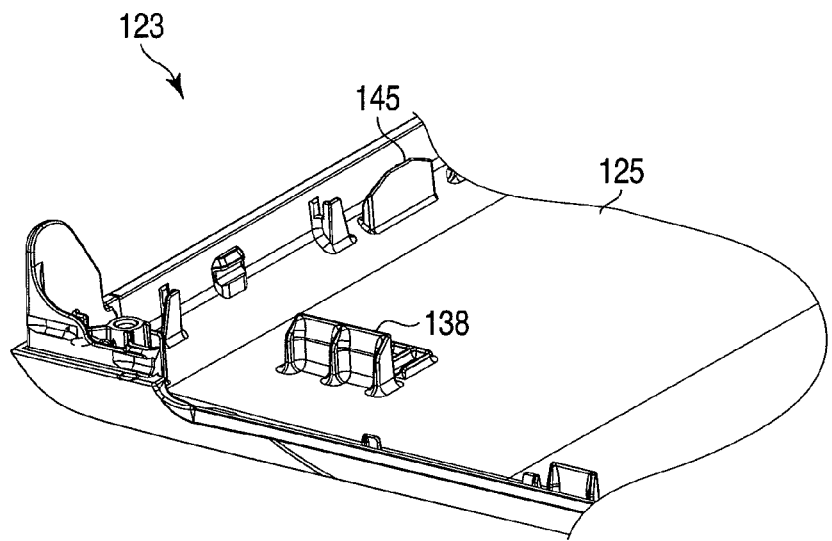
FIG. 16 is an exemplary perspective view showing part of an installation member used in the fifth embodiment.
Figure 17:
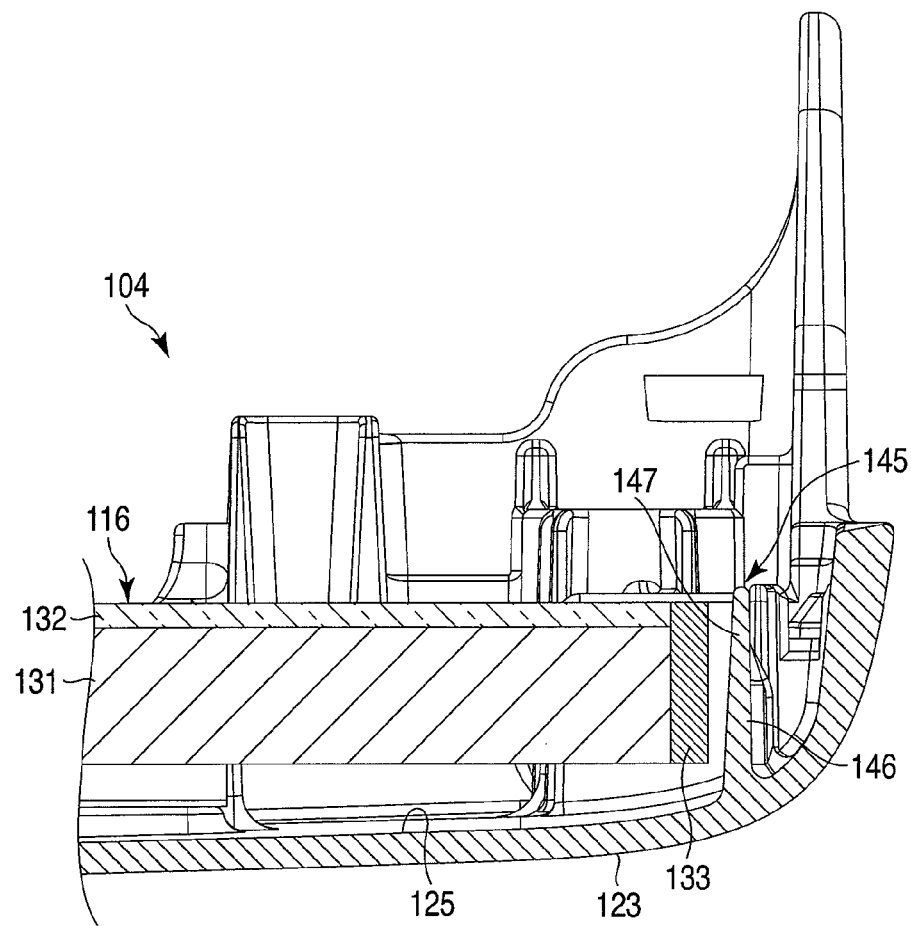
FIG. 17 is an exemplary sectional view of the second unit taken along line F17-F17 of FIG. 15.

FIG. 16 is a perspective view showing part of the installation member 123. FIG. 17 is a sectional view taken along line F17-F17 of FIG. 15 and showing part of the second unit 104. Like FIG. 15, FIG. 17 shows the second unit 104, with the cover member 121 removed.

A plurality of slanted ribs 145 are provided on a first inner face 123 of the installation member 123. The slanted ribs 145 include first portions 146 and second portions 147. The first portions 146 are an example of first receiving portions, and the second portions 147 are an example of second receiving portions. The slanted ribs 145 extend along the right and left side faces of the display module 116.

The first portions 146 protrude from the first inner face 125. The first portions 146 are slanted in a direction away from the display module 116. The first portions 146 are opposed to the side faces of the base portion 131 of the display module 116, with a frame 133 being located in between. On the other hand, the first portions 146 have their distal ends located away from the side faces of a panel 132 in the direction toward the first inner face 125.

The second portions 147 protrude from the distal ends of the first portions 146 toward the second inner face 126. The second portions 147 are thinner than the first portions 146.

The second portions 147 are slanted in a direction away from the display module 116. Therefore, the second portions 147 are located more away from the display module 116 than the first portions 146 are. The second portions 147 are slanted at the same angle as the first portions 146, but may be slanted differently from the first portions 146.

The gap between the second portions 147 and the second inner face 126 is narrower than the gap between the panel 132 and the second inner face 126. The second portions 147 are opposed to the side faces of the panel 132 of the display module 116, with the frame 133 being located between.

When the portable computer 101 is applied with an impact, the display module 116 may move relative to the second casing 115. If the display module 116 moves rightward or leftward, the first portions 146 receive only the base portion 131 through the use of the frame 133. If the impact applied to the portable computer 101 is very strong, the display module 116 is received not only by the first portions 146 but also by the second portions 147.

In this manner, the base portion 131 of the display module 116 is received by both the first portions 146 and the second portions 147 through the use of the frame 133. On the other hand, the panel 132 of the display module 116 is received only by the second portions 147 through the use of the frame 133.

the cover member 121 is pressed, it may be deformed. If the cover member 121 is deformed, the second portions 147 come into contact with the second inner face 126 of the cover member 121 and support the cover member 121. At the time, a gap is formed between the panel 132 and the second inner face 126.

The portable computer 101 of the above-mentioned structure is advantageous in that when the portable computer 101 is applied with an impact, the first portions 146 serve to receive the display module 116. Even when the impact applied to the personal computer 101 is very strong, the second portions 147 receive the display module 116.

The panel 132 is received only by the second portions 147. The external force exerted on the display module 116 is smaller when the display module 116 is received by the second portions 147 than when it is received by the first portions 146. Accordingly, the external force exerted on the panel 132 is reduced.

When the cover member 121 is applied with an external force, the second portions 147 come into contact with the second inner face 126 and support the cover member 121. At the time, the panel 132 is prevented from bumping into the cover member 121 or damaged thereby. In this manner, damage to the display module 116 is prevented.

The cushion members do not have to be attached to the display module; they may be attached to the second ribs, for example. In addition, electronic components of the display module are not limited to the fluorescent tube and circuit board described above and may be LEDs or other kinds of devices.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed:

1. A television comprising:
a casing comprising: a first inner face; and a second inner face opposed to the first inner face and provided with an opening section;
a display module comprising: a base portion arranged on the first inner face; and a panel laid over the base portion and exposed to an outside through the opening section;
a first receiving portion provided on the first inner face along a side face of the display module, wherein the first receiving portion is opposed to a side face of the base portion and located away from a side face of the panel in a direction toward the first inner face; and
a second receiving portion located further away from the display module than the first receiving portion, wherein the second receiving portion protrudes from the second inner face toward the first inner face more than the first receiving portion, wherein the second receiving portion is opposed to the side face of the panel, and
wherein a gap between the second receiving portion and the first inner face is narrower than a gap between the panel and the second inner face.

2. A television comprising:
a casing comprising: a first inner face; and a second inner face opposed to the first inner face and provided with an opening section;
a display module comprising: a base portion arranged on the first inner face; and a panel laid over the base portion and exposed to an outside through the opening section;
a first receiving portion provided on the first inner face along a side face of the display module, wherein the first receiving portion is opposed to a side face of the base portion and located away from a side face of the panel in a direction toward the first inner face; and
a second receiving portion located further away from the display module than the first receiving portion is located from the display module, wherein the second receiving portion protrudes toward the second inner face and is opposed to the side face of the panel, and
wherein the second receiving portion is located closer to the second inner face than the panel.

3. An electronic apparatus comprising:
a casing comprising a first inner face and a second inner face opposed to the first inner face;
a display module comprising: a base portion arranged on the first inner face, and a panel laid over the base portion;
a first receiving portion provided on the first inner face along a side face of the display module, wherein the first receiving portion is opposed to a side face of the base portion and located away from a side face of the panel in a direction toward the first inner face; and
a second receiving portion located further away from the display module than the first receiving portion, wherein the second receiving portion is opposed to the side face of the panel and protrudes from one of the first inner face and the second inner face toward the other,
wherein a gap between the second receiving portion and the first inner face or the second inner face, which is located further from a projected end of the second receiving portion, is narrower than a gap between the panel and the second inner face.

4. The electronic apparatus of claim 3, wherein:
the first receiving portion protrudes from the first inner face;

the second receiving portion protrudes from the first inner face more than the first receiving portion.

5. The electronic apparatus of claim 3, wherein:
the first receiving portion protrudes from the first inner face; and
the second receiving portion protrudes from a distal end of the first receiving portion, is angled in a direction away from the display module, and is thinner than the first receiving portion.

6. An electronic apparatus comprising:
a casing comprising a first inner face and a second inner face opposed to the first inner face;
a display module comprising: a base portion arranged on the first inner face, and a panel laid over the base portion;
a first receiving portion protruding from the first inner face along a side face of the display module, wherein the first receiving portion is opposed to a side face of the base portion and located away from a side face of the panel in a direction toward the first inner face; and
a second receiving portion located further away from the display module than the first receiving portion, wherein the second receiving portion is opposed to the side face of the panel and protrudes from the first inner face toward the second inner face more than the first receiving portion,
wherein the second receiving portion is located closer to the second inner face than the panel.

7. An electronic apparatus comprising:
a casing comprising a first inner face and a second inner face opposed to the first inner face;
a display module comprising: a base portion arranged on the first inner face, and a panel laid over the base portion;
a first receiving portion protruding from the first inner face along a side face of the display module, wherein the first receiving portion is opposed to a side face of the base portion and located away from a side face of the panel in a direction toward the first inner face; and
a second receiving portion located further away from the display module than the first receiving portion, wherein the second receiving portion is opposed to the side face of the panel and protrudes from the second inner face toward the first inner face more than the first receiving portion,
wherein a gap between the second receiving portion and the first inner face is narrower than a gap between the panel and the second inner face.

8. An electronic apparatus comprising:
a casing comprising a first inner face and a second inner face opposed to the first inner face;
a display module comprising: a base portion arranged on the first inner face, and a panel laid over the base portion;
a first receiving portion protruding from the first inner face along a side face of the display module, wherein the first receiving portion is opposed to a side face of the base portion and located away from a side face of the panel in a direction toward the first inner face; and
a second receiving portion which protrudes from a distal end of the first receiving portion, is angled in a direction away from the display module, and is thinner than the first receiving portion,
wherein the second receiving portion is located closer to the second inner face than the panel.

9. The electronic apparatus of claim 6, further comprising:
a cushion member between the second receiving portion and the side face of the display module.

10. The electronic apparatus of claim 7, further comprising:

a cushion member between the second receiving portion and the side face of the display module.

11. The electronic apparatus of claim 8, further comprising:
a cushion member between the second receiving portion and the side face of the display module.

12. The electronic apparatus of claim 6, wherein a gap between the first receiving portion and the second inner face is greater than a thickness of the display module.

13. The electronic apparatus of claim 7, wherein a gap between the first receiving portion and the second inner face is greater than a thickness of the display module.

14. The electronic apparatus of claim 6, wherein:
the display module further comprises an electronic component along the side face of the display module; and
the first receiving portion is located at a position separate from a position opposed to the electronic component.

15. The electronic apparatus of claim 7, wherein:
the display module further comprises an electronic component along the side face of the display module; and
the first receiving portion is located at a position separate from a position opposed to the electronic component.

16. The electronic apparatus of claim 8, wherein:
the display module further comprises an electronic component along the side face of the display module; and
the first receiving portion is located at a position separate from a position opposed to the electronic component.

17. An electronic apparatus comprising:
a casing;
a display module comprising: a base portion arranged on an inner face of the casing; and a panel laid over the base portion;
a first receiving portion provided on the casing along a side face of the display module, wherein the first receiving portion is opposed to a side face of the base portion and located away from a side face of the panel in a direction toward the base portion; and
a second receiving portion located further away from the display module than the first receiving portion, wherein the second receiving portion is opposed to the side face of the panel and protrudes beyond the panel in a direction away from the base portion.

* * * * *